United States Patent
Zhang (10) Patent No.: US 10,678,662 B2
(45) Date of Patent: Jun. 9, 2020

(54) COMPUTING SYSTEM WITH DATA PROTECTION MECHANISM WITH SOFT INFORMATION AND METHOD OF OPERATION THEREOF

(71) Applicant: CNEXLABS, Inc., San Jose, CA (US)

(72) Inventor: Xiaojie Zhang, Saratoga, CA (US)

(73) Assignee: CNEX LABS, Inc., San Jose, CA (US)

( * ) Notice: Subject to any disclaimer, the term of this patent is extended or adjusted under 35 U.S.C. 154(b) by 57 days.

(21) Appl. No.: 15/081,734

(22) Filed: Mar. 25, 2016

(65) Prior Publication Data

US 2017/0192858 A1 Jul. 6, 2017

Related U.S. Application Data

(60) Provisional application No. 62/274,743, filed on Jan. 4, 2016.

(51) Int. Cl.
| | |
|---|---|
| *G06F 11/00* | (2006.01) |
| *G06F 11/16* | (2006.01) |
| *G06F 11/20* | (2006.01) |
| *G06F 13/40* | (2006.01) |
| *G06F 13/42* | (2006.01) |
| *G06F 11/10* | (2006.01) |

(52) U.S. Cl.
CPC ........ *G06F 11/167* (2013.01); *G06F 11/1076* (2013.01); *G06F 11/2017* (2013.01); *G06F 13/4068* (2013.01); *G06F 13/4282* (2013.01); *G06F 2201/85* (2013.01); *G06F 2213/0026* (2013.01); *G06F 2213/0028* (2013.01); *G06F 2213/0032* (2013.01)

(58) Field of Classification Search
CPC .......................... G06F 11/167; G06F 11/2017
See application file for complete search history.

(56) References Cited

U.S. PATENT DOCUMENTS

| | | | |
|---|---|---|---|
| 8,286,048 B1 | 10/2012 | Chen et al. | |
| 8,443,270 B2 | 5/2013 | Yuan et al. | |
| 8,935,595 B2 | 1/2015 | Zhong et al. | |
| 2008/0301403 A1* | 12/2008 | Arntzen | G06F 11/1052 712/22 |
| 2010/0309810 A1* | 12/2010 | Wachsmann | H04L 1/0045 370/252 |
| 2012/0140796 A1* | 6/2012 | Dai | H04B 7/15592 375/213 |
| 2016/0344426 A1* | 11/2016 | Bhatia | H03M 13/2927 |

* cited by examiner

*Primary Examiner* — Katherine Lin
(74) *Attorney, Agent, or Firm* — Perspectives Law Group, Corp.

(57) ABSTRACT

A computing system includes: a data block including a data; a storage engine, coupled to the data block, configured to process data, as hard information or soft information, through channels including a failed channel and a remaining channel, calculate an aggregated output from a hard decision from the remaining channel, calculate a selected magnitude from a magnitude from the remaining channel with an error detected, calculate an extrinsic soft information based on the aggregated output and the selected magnitude, and decode the failed channel with a scaled soft metric based on the extrinsic soft information.

30 Claims, 8 Drawing Sheets

COMPUTING SYSTEM WITH DATA PROTECTION MECHANISM WITH SOFT INFORMATION AND METHOD OF OPERATION THEREOF

CROSS-REFERENCE TO RELATED APPLICATION(S)

This application claims the benefit of U.S. Provisional Patent Application Ser. No. 62/274,743 filed Jan. 4, 2016, and the subject matter thereof is incorporated herein by reference thereto.

TECHNICAL FIELD

An embodiment of the present invention relates generally to a computing system, and more particularly to a system for data protection.

BACKGROUND

Modern consumer and industrial electronics, especially devices such as graphical computing systems, televisions, projectors, cellular phones, portable digital assistants, and combination devices, are providing increasing levels of functionality to support modern life including three-dimensional display services. Research and development in the existing technologies can take a myriad of different directions. As data become more pervasive, existing and new systems need to interoperate and provide data reliability.

Thus, a need still remains for a computing system with data protection mechanism with soft information to provide improved data reliability and recovery. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus including a data block including a data; a storage engine, coupled to the data block, configured to process the data, as hard information or soft information, through channels including a failed channel and a remaining channel, calculate an aggregated output from a hard decision from the remaining channel, calculate a selected magnitude from a magnitude from the remaining channel with an error detected, calculate an extrinsic soft information based on the aggregated output and the selected magnitude, and decode the failed channel with a scaled soft metric based on the extrinsic soft information.

An embodiment of the present invention provides a method including processing data, as hard information or soft information, through channels including a failed channel and a remaining channel; calculating an aggregated output from a hard decision from the remaining channel; calculating a selected magnitude from a magnitude from the remaining channel with an error detected; calculating an extrinsic soft information based on the aggregated output and the selected magnitude; and decoding the failed channel with a scaled soft metric based on the extrinsic soft information.

An embodiment of the present invention provides a non-transitory computer readable medium including: processing data, as hard information or soft information, through channels including a failed channel and a remaining channel; calculating an aggregated output from a hard decision from the remaining channel; calculating a selected magnitude from a magnitude from the remaining channel with an error detected; calculating an extrinsic soft information based on the aggregated output and the selected magnitude; and decoding the failed channel with a scaled soft metric based on the extrinsic soft information.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the embodiments can be operated in any orientation. The embodiments can be numbered first embodiment, second embodiment, etc. as a matter of descriptive convenience and are not intended to have any other significance or provide limitations for an embodiment.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims. The term "unit" referred to herein can include hardware only implementations, where performance requirements preclude the use of software.

Figure 1:
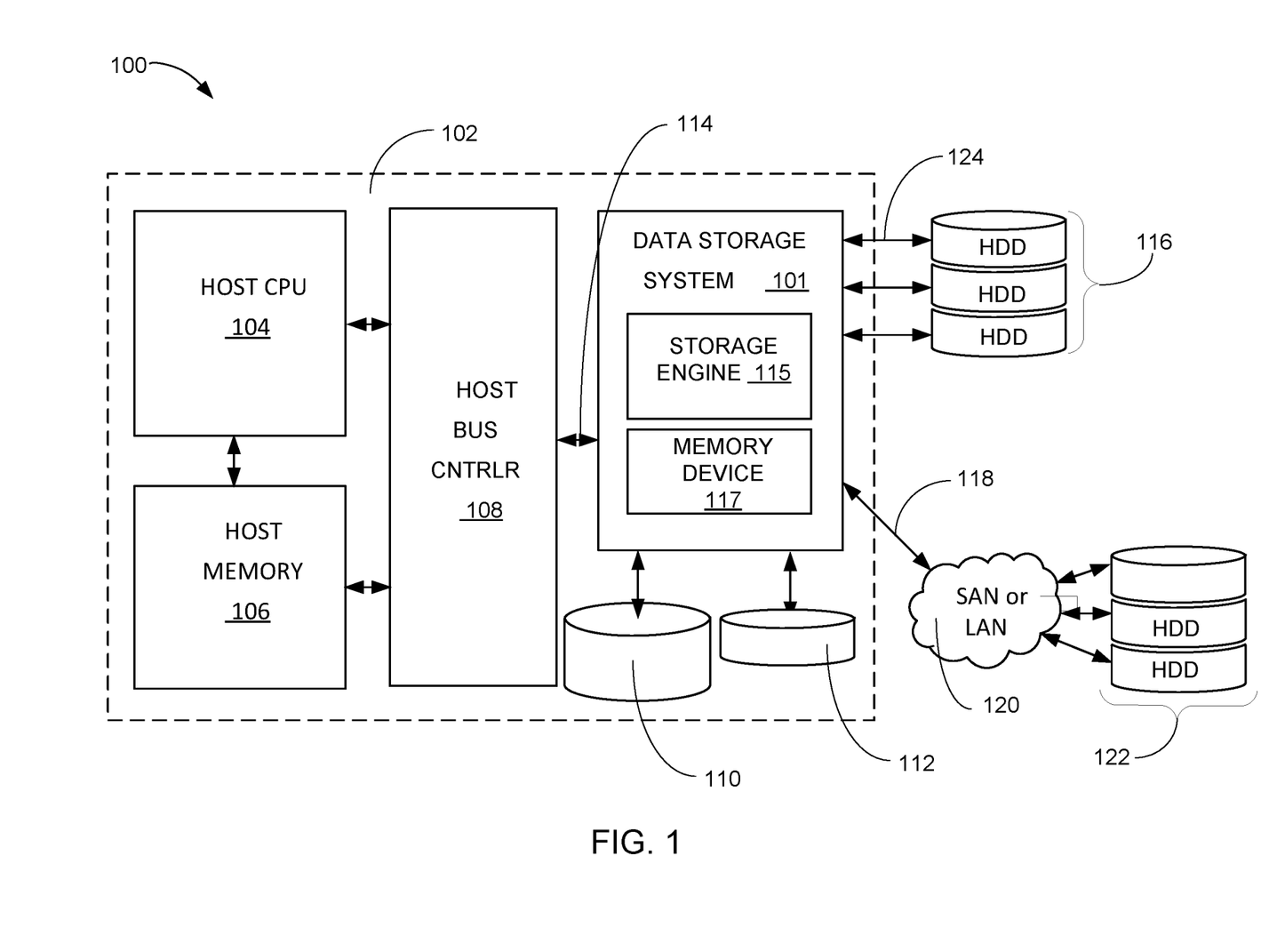
FIG. 1 is a computing system with data protection mechanism in an embodiment.

Referring now to FIG. 1, therein is shown a computing system 100 with data protection mechanism in an embodiment. The computing system 100 is depicted in FIG. 1 as a functional block diagram of the computing system 100 with a data storage system 101. The functional block diagram depicts the data storage system 101 installed in a host computer 102.

The host computer 102 can provide computational and interface resources for the computing system 100. The host computer 102 can also provide or interface with storage resources for or to the computing system 100.

The host computer 102 can be implemented in a number of ways. As an example, the host computer 102 can be as a server, workstation, a router, a desktop computer, a mobile computing device or a combination thereof. The host computer 102 can include at least a host central processing unit 104, a host memory 106 coupled to the host central processing unit 104, and a host bus controller 108.

The host bus controller 108 can provide interface functions to and from the host computer 102. As an example, the host bus controller 108 provides a host interface bus 114, which allows the host computer 102 to utilize the data storage system 101.

It is understood that the function of the host bus controller 108 can be provided by host central processing unit 104 in some implementations. The host central processing unit 104 can be implemented with hardware circuitry in a number of different manners. For example, the host central processing unit 104 can be a processor, an application specific integrated circuit (ASIC) an embedded processor, a microprocessor, a hardware control logic, a hardware finite state machine (FSM), a digital signal processor (DSP), or a combination thereof.

The data storage system 101 can provide storage capacity for the computing system 100. The data storage system 101 can also provide or include processing capabilities, similar to the host computer 102. As examples, the data storage system 101 can be coupled to a solid state disk 110, such as a non-volatile memory based storage device including a peripheral interface system, or a non-volatile memory 112, such as an internal memory card for expanded or extended non-volatile system memory.

The data storage system 101 can also be coupled to hard disk drives (HDD) 116 that can be mounted in the host computer 102, external to the host computer 102, or a combination thereof. The solid state disk 110, the non-volatile memory 112, and the hard disk drives 116 can be considered as direct attached storage (DAS) devices, as an example.

The data storage system 101 can also support a network attach port 118 for coupling to a network 120. The network 120 provide a mechanism for connection between elements. The network 120 can span numerous distances, utilize numerous protocols, and can include both wired, optical, and wireless communications. Examples of the network 120 can be a local area network (LAN) and a storage area network (SAN). The network attach port 118 can provide access to network attached storage (NAS) devices 122.

While the network attached storage devices 122 are shown as hard disk drives, this is an example only. It is understood that the network attached storage devices 122 could include magnetic tape storage (not shown), and storage devices similar to the solid state disk 110, the non-volatile memory 112, or the hard disk drives 116 that are accessed through the network attach port 118. Also, the network attached storage devices 122 can include just a bunch of disks (JBOD) systems or redundant array of intelligent disks (RAID) systems as well as other network attached storage devices 122.

The data storage system 101 can be attached to the host interface bus 114 for providing access to and interfacing to multiple of the direct attached storage (DAS) devices via a cable 124 for storage interface, such as Serial Advanced Technology Attachment (SATA), the Serial Attached SCSI (SAS), or the Peripheral Component Interconnect—Express (PCI-e) attached storage devices.

The data storage system 101 can include a storage engine 115 and memory devices 117. The storage engine 115 can be implemented with hardware circuitry, software, or a combination thereof in a number of ways. For example, the storage engine 115 can be implemented as a processor, an application specific integrated circuit (ASIC) an embedded processor, a microprocessor, a hardware control logic, a hardware finite state machine (FSM), a digital signal processor (DSP), or a combination thereof.

The storage engine 115 can control the flow and management of data to and from the host computer 102, and from and to the direct attached storage (DAS) devices, the network attached storage devices 122, or a combination thereof. The storage engine 115 can also perform data reliability check and correction, which will be further discussed later. The storage engine 115 can also control and manage the flow of data between the direct attached storage (DAS) devices and the network attached storage devices 122 and amongst themselves. The storage engine 115 can be implemented in hardware circuitry, a processor running software, or a combination thereof.

For illustrative purposes, the storage engine 115 is shown as part of the data storage system 101, although the storage engine 115 can be implemented and partitioned differently. For example, the storage engine 115 can be implemented as part of in the host computer 102, implemented partially in software and partially implemented in hardware, or a combination thereof. The storage engine 115 can be external to the data storage system 101. As examples, the storage engine 115 can be part of the direct attached storage (DAS) devices described above, the network attached storage devices 122, or a combination thereof. The functionalities of the storage engine 115 can be distributed as part of the host computer 102, the direct attached storage (DAS) devices, the network attached storage devices 122, or a combination thereof.

The memory devices 117 can function as a local cache to the data storage system 101, the computing system 100, or a combination thereof. The memory devices 117 can be a volatile memory or a nonvolatile memory. Examples of the volatile memory can be static random access memory (SRAM) or dynamic random access memory (DRAM). As examples, the storage engine 115 and the memory devices 117 enable the data storage system 101 to meet the performance requirements of data provided by the host computer 102 and store that data in the solid state disk 110, the non-volatile memory 112, the hard disk drives 116, or the network attached storage devices 122.

For illustrative purposes, the data storage system 101 is shown as part of the host computer 102, although the data storage system 101 can be implemented and partitioned differently. For example, the data storage system 101 can be implemented as a plug-in card in the host computer 102, as part of a chip or chipset in the host computer 102, as partially implemented in software and partially implemented in hardware in the host computer 102, or a combination thereof. The data storage system 101 can be external to the host computer 102. As examples, the data storage system 101 can be part of the direct attached storage (DAS) devices described above, the network attached storage devices 122, or a combination thereof. The data storage system 101 can be distributed as part of the host computer 102, the direct attached storage (DAS) devices, the network attached storage devices 122, or a combination thereof.

Figure 2:
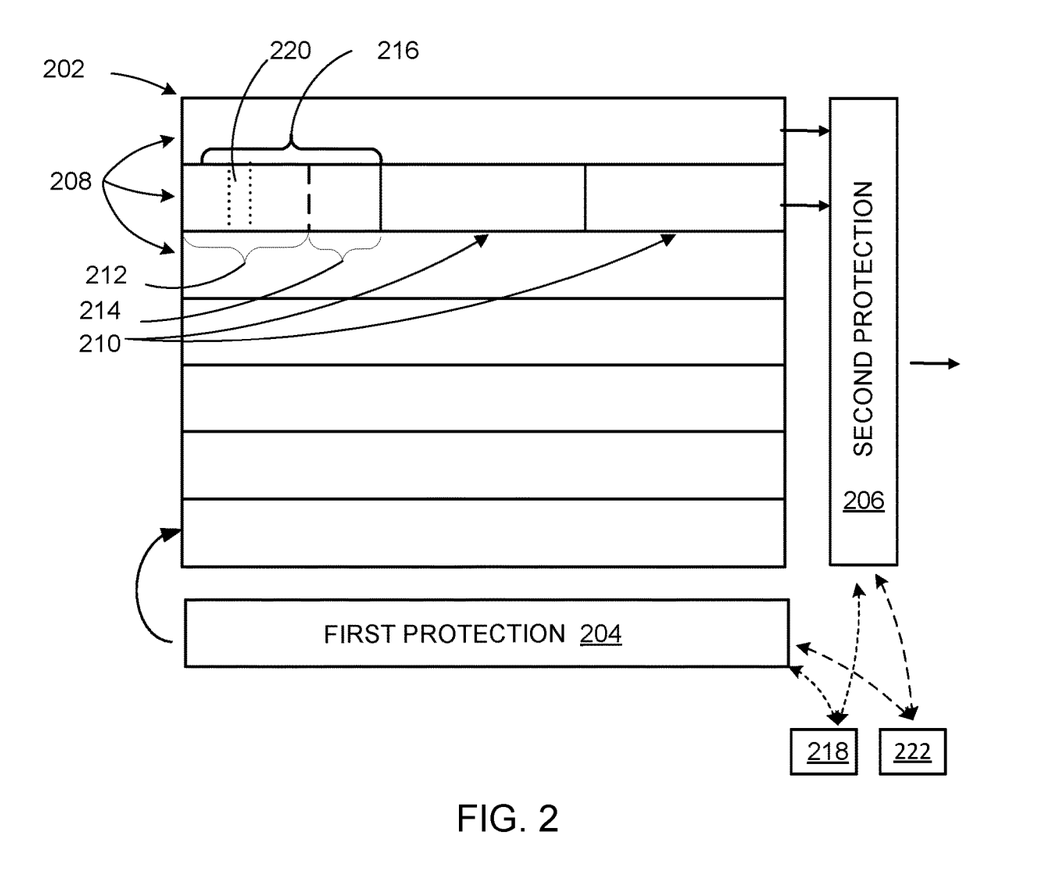
FIG. 2 depicts architectural views of the data protection mechanism in an embodiment.

Referring now to FIG. 2, therein is shown an architectural view of a data protection mechanism in an embodiment. The depiction in FIG. 2 is an example. The architectural view of the data protection mechanism depicts a data block 202, a first protection 204, and a second protection 206.

The first protection 204 is a column protection that can detect and correct errors in the particular column of the data block 202. The first protection 204 can be utilized to provide soft information 218, hard information 222, or a combination thereof. The second protection 206 is shown on the right-hand side of the data block 202 and is a row protection that can detect and correct errors in the particular row of the data block 202. The second protection 206 can be utilized to also provide the soft information 218, the hard information 222, or a combination thereof. The second protection 206 can be implemented as a protection for each of the data sectors 210 in each of the data page 208.

The data block 202 can include data to be protected. The data block 202 represent physical storage that can contain information transferred from or to the host memory 106 of FIG. 1. The data block 202 can include storage elements from the host computer 102, the network attached storage devices 122, the DAS devices, or a combination thereof. As a more specific example, the data block 202 can represent physical storage including the memory devices 117, the solid state disk 110, the non-volatile memory 112, the hard disk drives 116 or a combination thereof.

Also as an example, the data block 202 can also represent a super block, which represents is a subdivision of a larger storage subsystem. When a storage device is too large to address directly a super block can be used to account for a portion of the storage capacity. As an example, the super block can contain up to a maximum addressable space (in 32 bit addressing that is 4 GB) the number of super blocks can form the entire capacity. An example application where a super block can be utilized is in flash memory where the accounting of wear activity must be maintained for data protection and wear leveling.

The data block 202 can include and be organized into data pages 208. Each of the data pages 208 can include data sectors 210. As an example, the data block 202 can be distributed across multiple devices, such as host computer 102, the direct attached storage (DAS) devices, the network attached storage devices 122, or a combination thereof. Also as an example, the data block 202 can be non-distributed and within one device in the computing system 100.

As an example, the data protection mechanism for the data block 202 can be implemented as a 2D RAID parity with the first protection 204, the second protection 206, or a combination thereof. In this example, the data block 202 can be a RAID block. The data page 208 can represent data organized in groups of the data sectors 210. Each of the data pages 208 can include a fixed number of the data sectors 210. Each of the data sectors 210 can include sector data 212 and the sector redundancy 214, which can be an error correction block for the sector data 212.

The sector data 212 and a sector redundancy 214 can make up a codeword 216. The codeword 216 is a particular sequence of data or information for an error detection or error correction scheme. The sector redundancy 214 provides capabilities for the error detection, error correction, or a combination thereof for the sector data 212 with which it is associated. The codeword 216 can operate on or output the soft information 218 as well as the hard information 222. As a specific example, the sector redundancy 214 can operate on or output the soft information as well as the hard information 222. As an example, the codeword 216 in FIG. 2 is shown to be a subset of the each of the data sectors 210 where the data sectors 210 can include other information not part of the codeword 216.

Examples of sector redundancy 214 can include and can accommodate redundancy part of error correction codes (ECC), a cyclic redundancy check (CRC), or other types of error detection or correction schemes to form a codeword 216. As more specific examples, the codeword 216 can be systematic code or nonsystematic code, a block code, or a convolution code. As further examples, the codeword 216 can be a Bose, Chaudhuri, and Hocquenghem (BCH) codeword, a Reed-Solomon codeword, or a low density parity check (LDPC) codeword. The entirety of the data page 208 can be used as the codeword 216 for error detection and correction for, by example, an LDPC checker hardware structure (not shown).

For illustrative purposes, the codeword 216 is descried as a BCH codeword, although it is understood the codeword 216 can be other types using different error detection and correction codes. For example, other block codes can be utilized to form the codeword 216. As more specific examples, the codeword 216 can be formed with Reed-Solomon code or LDPC code. The codeword 216 can be utilized to provide the soft information 218, the hard information 222, or a combination thereof.

In some cases, it could be costly to obtain soft information 218, hence after codeword 216, or as a specific example the sector redundancy 214, fails to correct errors with the hard information 222, the computing system 100 can continue to recover the data for the data sectors 210 with the first protection 204, the second protection 206, or a combination thereof. Otherwise, the computing system 100 can continue to recover the data for the data sectors 210 with the first protection 204, the second protection 206, or a combination thereof, when codeword 216 fails after utilizing the soft information 218, the hard information 222, or a combination thereof. The decoding sequence can vary between the first protection 204 or the second protection 206 following the decoding of the sector redundancy 214. As a specific example, if the codeword 216 is uncorrectable, then the computing system 100 can apply RAID assisted decoding.

The following will be described with the first protection 204 being decoded before the second protection 206, although it is understood that the decoding can be with the second protection 206 followed by the first protection 204.

Further the first protection 204 can utilize soft information 218, hard information 22, or a combination thereof associated with the data page 208. The soft information 218 provides some measure of reliability for decoded data. The soft information 218 include metrics for the confidence for the information being processed or generated. Examples of the soft information can include Log-Likelihood-Ratio (LLR) for non-volatile memory and can be utilized with the first protection 204.

The first protection 204 can also be considered as part of the data block 202 and as one or a plurality of the data page 208. The first protection 204, in this example, can be considered one sector data 212 used as RAID parity page for other instances of the sector data 212 within the data page 208 of the data block 202. The first protection 204 can also be other error correction or error detection scheme.

The data pages 208 can include symbols 220. The codeword 216 can also include the symbols 220. Each of the symbols 220 represents a number of data or information units in the data page 208. For example, each of the symbols 220 can be a bit or can be number of bits or tuple, such as a byte (8 bits).

One embodiment of the first protection 204 can be the RAID parity page and can include providing parity information across the data page 208 in the data block 202, which can be viewed as a RAID block. There are at least 2 ways in which this can be accomplished.

In an embodiment, the first protection 204 can be used as the RAID parity page to represent the parity of the sum of all the data pages 208 in the data block 202 as the RAID block. As an example, the first protection 204 would store the RAID parity on a sector-by-sector basis because the data page 208 contain the same number of data bytes in the data sectors 210.

In this approach, the first protection 204 as the RAID parity page could be formatted like the data page 208 where each of the data sectors 210 is protected by the sector redundancy 214, such as an ECC. Here, the payload for the data sectors 210 is the parity for payloads of the data page 208. An embodiment can provide parity information for the sectors in the RAID parity page, as the first protection 204, and the other would provide parity information for all the parity sectors in the data block 202 with the second protection 206.

An embodiment provides iterative RAID assisted decoding. For this embodiment, the first protection 204 is described as the RAID parity page for third example above. In this case all parity sectors as a portion of the data sectors 210 are covered by RAID parity and the RAID parity page behaves like the data page 208.

Figure 3:
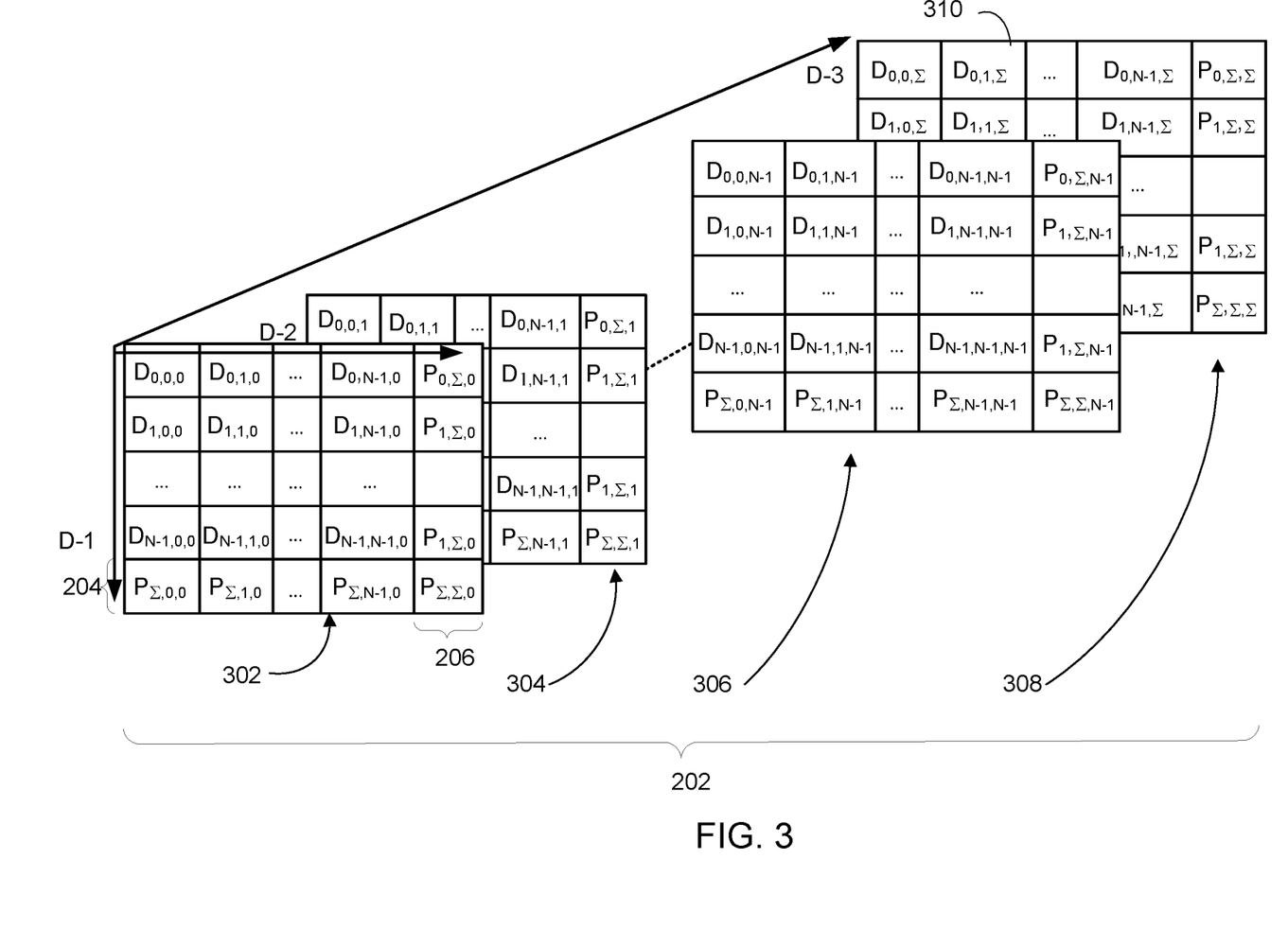
FIG. 3 is an example of extending FIG. 2 to additional dimensions in an embodiment.

Referring now to FIG. 3, therein is shown an example of extending FIG. 2 to additional dimensions in an embodiment. As an example of an embodiment, FIG. 2 depicts a data protection mechanism and is described as a two-dimensional (2D) protection for the data block 202. As a specific example, the data protection mechanism in FIG. 2 is described with the first protection 204 and the second protection 206.

For illustrative purposes, the computing system 100 is described with two-dimensional (2D) protection for the data block 202 in FIG. 2, although it is understood that various embodiments are not limited to 2D protection and can extend M-dimensions where M can be an integer greater than 2. For example, other protection can be applied to the same data block 202, the same data sectors 210, or a combination thereof similarly as the first protection 204, the second protection 206, or a combination thereof for M-dimensional protection. As example, various embodiments can be for further protection applied to the data block 202, the data sectors 210, or a combination thereof for 3D, 4D, 5D, etc. protection.

As an example, the embodiment shown in FIG. 3 depicts a three-dimensional protection of the data blocks 202. FIG. 3 can depict the data blocks 202 to include a first block 302, a second block 304, an M−1 block 306, and an M block 308. In this example, each of the data blocks include the first protection 204 and the second protection 206, as described in FIG. 2. The first protection 204 can be computed along the arrow next to "D−1", which can represent dimension one or the first dimension. The second protection 206 can be computed along the arrow next to "D−2", which can represent dimension two or the second dimension.

In this example the M block 308 is used to calculate a third protection 310 where the entire M block 308 can represent the third protection 310. The third protection 310 can be computed along the arrow next to "D−3", which can represent dimension three or the third dimension. The third protection 310 and each of the values in the third protection 310 is computed with the data blocks 202 from the first block 302 through the M−1 block 306.

As a specific example, FIG. 3 can depicts a multi-dimensional M×(N+1) RAID scheme. In a one dimensional RAID, each data unit shown as $D_{i,t,u}$ within each of the data blocks 202 can be covered by one parity. In the example of M-dimensional RAID, each data unit is covered be M parity or covered by M different RAID stripes. In the example depicted in FIG. 3, the data unit shown as $D_{0,0,0}$ is covered by $P_{\Sigma,0,0}$ from the first protection 204, $P_{0,\Sigma,0}$ in the second protection 206, and $D_{0,0,\Sigma}$ in the third protection 310 where M=3.

In the three dimension example shown in FIG. 3, the first protection 204, the second protection 206, and the third protection 310 can be computed as follows where the index to each of the data unit as $D_{s,t,u}$, $0 \leq s,t,u \leq N-1$. The parity or the protection can be computed with:

$$P_{\Sigma,t,u} = \sum_{i=0}^{N-1} D_{i,t,u},$$

$$P_{s,\Sigma,u} = \sum_{i=0}^{N-1} D_{s,i,u},$$

$$P_{s,t,\Sigma} = \sum_{i=0}^{N-1} D_{s,t,i},$$

$$P_{s,\Sigma,\Sigma} = \sum_{i=0}^{N-1} D_{s,\Sigma,i} = \sum_{i=0}^{N-1} D_{s,i,\Sigma},$$

$$P_{\Sigma,t,\Sigma} = \sum_{i=0}^{N-1} D_{\Sigma,t,i} = \sum_{i=0}^{N-1} D_{i,t,\Sigma},$$

$$P_{\Sigma,\Sigma,u} = \sum_{i=0}^{N-1} D_{\Sigma,i,u} = \sum_{i=0}^{N-1} D_{i,\Sigma,u},$$

$$P_{\Sigma,\Sigma,\Sigma} = \sum_{i=0}^{N-1} D_{i,\Sigma,\Sigma} = \sum_{i=0}^{N-1} D_{\Sigma,i,\Sigma} = \sum_{i=0}^{N-1} D_{\Sigma,\Sigma,i}.$$

As an example, when each of the data units is coded with linear ECC codes, all parties in the protection are also valid ECC codewords. The data unit can represent a data block 202, the data page 208 of FIG. 2, the codeword 216 of FIG. 2, the symbols 220, or a combination thereof.

Also for example, the RAID stripes of each dimension can be formed from data units from any predefined sets. As a specific example, the DX is a channel RAID, DY is a die RAID, and DZ is a device RAID.

Figure 4:
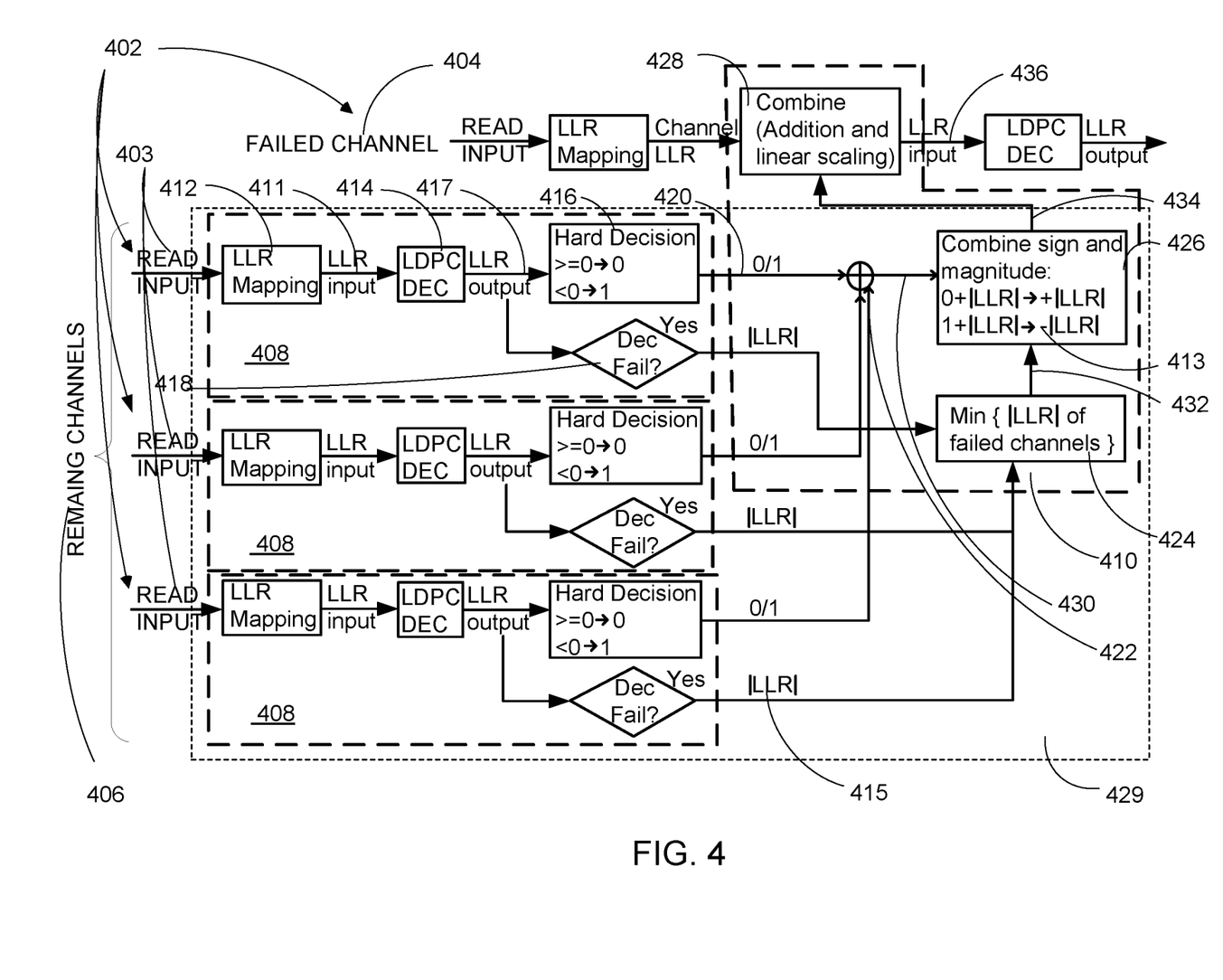
FIG. 4 is an example of a flow chart for a portion of the computing system for the data protection mechanism in an embodiment.

Referring now to FIG. 4, therein is shown an example of a control flow for a portion of the computing system 100 for the data protection mechanism in an embodiment. In this example, the control flow depicts a number of channels 402 being read, decoded, or a combination thereof.

The channels 402 represent processing of data 403 or information from various sources. The data 403 can represent the soft information 218 of FIG. 2 or the hard information 222 of FIG. 2. The channels 402 can receive the data 403 from a single circuit device, from sources extending across a network or a combination thereof. The channels 402 can represent the sources themselves as well as perform the processing of the data 403 or information.

As examples, the channels 402 can represent the data block 202 of FIG. 2, the data pages 208 of FIG. 2, the data sectors 210 of FIG. 2, or the combination thereof. Also as examples, the channels 402 can represent one or more of the storage elements shown in FIG. 1, such as the data storage system 101 of FIG. 1, the direct attach storage devices, the solid state disk 110 of FIG. 1, the non-volatile memory 112 of FIG. 1, the hard disk drives 116 of FIG. 1, the memory devices 117 of FIG. 1, the network attached storage devices 122 of FIG. 1, or a combination thereof.

As a specific example, the channels 402 in this embodiment can provide RAID functionality, such as RAID 4/5, which the parity is XOR of the data across the stripes. The channels 402 can represent the stripes for this example.

FIG. 4 depicts an example where one of the channels 402 failed decoding while the other channels 402, whether failed or not, can provide information to help the channel 402 that failed. The channel 402 with the decoding failure and targeted for recovery is referred to as a failed channel 404, for purposes of clarity for describing an embodiment. Remaining channels 406 refer to the other channels 402 that can be possess a decoding failure as well or one with successful decoding. The remaining channels 406 can fail to detect a decoding failure, decoded successfully, or detected a decoding failure.

In this example, the embodiment for each of the remaining channels 406 are shown to include a channel decoder 408. The channel decoder 408 from each of the remaining channels 406 output to a cross channel decoder 410.

The channel decoder 408 can be used to recover data from each if its respective channels 402. The channel decoder 408 can accept input data from the each of their respective channels 402.

The cross channel decoder 410 allows the information from at least one of the channels 402 to help decode at least one of the other channels 402. In this example, the information from the remaining channels 406 can be used to help decode the failed channel 404. The failed channel 404 can also include the channel decoder 408 but is not illustrated the as such in FIG. 4. Instead, FIG. 3 depicts the failed channel 404 performing processing with portions of the channel decoder 408 in an attempt to correct the failed decoding with information from the remaining channels 406.

Returning to the description for the channel decoder 408, the channel decoder 408 can accept the hard information 222 of FIG. 2, the soft information 218 of FIG. 2, or a combination thereof. The channel decoder 408 can also process and output the hard information 222, the soft information 218, or a combination thereof.

The hard information 222 (or data) includes binary information, as an example, which includes only 0s and 1s. The hard information 222 can also include other information based on the basis of the information unit. As an example, the hard information 222 can be based on a b-tuple whereby b=2 represent a binary number system. Other values of b can also represent the value of what the hard information 222 can represent. For example, b=3 can be a ternary number system where the hard information 222 can include values from 0, 1, or 2. Generally, the hard information 222 can include values from 0, 1, . . . (b−1). The soft information 218 of FIG. 2 (or data) includes non-binary information which can take values of real or integer numbers or generally not limited to discrete values in a b-tuple number system. For brevity and clarity, the embodiment is be described with b=2 or for a binary numbering system as an example and without limitations.

In this embodiment as an example, the channel decoder 408 can include a mapper 412, a correction decoder 414, a hard selector 416, or a combination thereof. The channel decoder 408 can also include a failure query 418. The mapper 412 converts or calculates the read data (labeled as read input in FIG. 4) for decoding. As a specific example, the mapper 412 can convert the hard information 222 from the read data for soft decoding. In other words, the mapper 412 can calculate soft metric 411 based on the hard information 222. The soft metric 411 provides the information similar to the soft information 218 but can be based on a particular metric.

As examples, the hard information 222 can be from the data block 202, the data pages 208, the data sectors 210, or a combination thereof. Further as examples, the hard information 222 can also be from the codeword 216 of FIG. 2, the sector data 212 of FIG. 2, the sector redundancy 214 of FIG. 2, the first protection 204 of FIG. 2, the second protection 206 of FIG. 2, or a combination thereof.

As a more specific example, the mapper 412 can provide the soft metric 411 including a sign 413 and a magnitude 415 from the read data. The mapper 412 can calculate the sign 413 from the read data for the soft information 218 corresponding to the 0 or 1. The mapper 412 can provide magnitudes 415 for the read data and the magnitudes 415 represent the confidence for successful decoding. For example, the mapper 412 can calculate the soft metric 411 as a log likelihood ratio (LLR). The LLR is computed as $$LLR(r) = \log \frac{Prob(r = 0)}{Prob(r = 1)}$$

and is one example of the soft information 218. The variable r represent the read input for that particular channel 402.

Continuing with the example with LLR, the mapper 412 can compute the sign 413 when the read input is hard information 222, e.g. 0 or 1, as follows. For example where the term "s" represent the sign 413, let s=0 if LLR(r)>0, let s=1 if LLR(r)<0, and for LLR(r)=0, s can be assigned with either 0 or 1. The magnitude 415 is denoted as |LLR|.

In the example where the read input to the mapper 412 is the soft information 218 or not hard read data, then the mapper 412 can compute the soft metric 411 as the LLR information or look up the information based on using the r as an index to access bin information. Bin information include characterization data for the type of memory where the read data is being sourced. As an example, if the sources for the read input are non-volatile memory devices, such as NAND memory, the bin information can be based on the value of threshold voltage and probability of successful access to the memory device or memory cell. The decoding process can continue from the mapper 412 to the correction decoder 414.

The correction decoder 414 can attempt to recover the read data. The mapper 412 can provide the soft metric 411 including the sign 413, the magnitude 415, or a combination thereof. The correction decoder 414 can operate on the data block 202 or a portion of the data block 202. As specific examples, the correction decoder 414 can operate on the sector redundancy 214, the first protection 204, the second protection 206, or a combination thereof.

The correction decoder 414 can perform error detection or error correction based on soft decoding. In this example the correction decoder 414 is illustrated as operating as a soft decoder and outputting a decoded output 417, shown as an example as LLR output. The decoded output 417 provides an indication of the correction decoder 414 detected an error or successfully decoded the read data. The decoded output 417 can provide information similar to that of soft information 218. In the LLR example for the soft metric 411, the decoded output 417 can include a sign 413 and a magnitude 415. The decoding processing can continue from the correction decoder 414 to the hard selector 416. This path can be optionally conditioned upon when the correction decoder 414 cannot detect an error or corrected the error.

The hard selector 416 calculates a b-tuple value as hard decisions 420 from the decoded output 417. The hard decisions 420 are the hard information 222. As an example, the hard selector 416 can utilize the sign 413 from the decoded output 417 to determine or calculate the hard decision 420.

As clarification, soft ECC decoders can take soft information 218, in this example the soft metric 411, as input and output soft decoding information, in this example the decoded output 417. For hard ECC decoder, such as hard BCH decoder example, the hard selector 416 can receive binary input (or b-tuple input) and output binary (or b-tuple) strings. The soft ECC decoder can process both hard and soft inputs, and generate soft outputs which can be then converted into hard output by the hard selector 416. The hard selector 416 can provide the hard decisions 420 the cross channel decoder 410.

Returning to the correction decoder 414, the process can continue to the failure query 418 when the correction decoder 414 has detected an error, cannot successfully correct the error, or a combination thereof. When this occurs, the failure query 418 can pass the magnitude 415 from the decoded output 417 to the cross channel decoder 410. The larger the magnitude 415 of LLR (denoted as |LLR|), the more likely the hard decision 420 generated by the hard selector 416 is correct. In other words, the magnitude 415 of the decoded output 417 represents the confidence of the hard decision 420. The failure query 418 can output the magnitude 415 from the decoded output 417 to the cross channel decoder 410.

For illustrative purposes, the remaining channels 406 are shown to include the channel decoder 408 that are the same, although it is understood that the computing system 100 of FIG. 1 can be configured differently. For example the channel decoder 408 can be different between the remaining channels 406. For example, some instances of the mapper 412 can support input only for hard input, such as discrete values of b-tuple number system while other instances of the mapper 412 in other channels 402 can support only input for soft information 218.

Also for illustrative purposes, the channel decoder 408 is described operating with the mapper 412, the correction decoder 414, and the hard selector 416, although it is understood that the channel decoder 408 can operate differently. For example, the failed channel 404 is also one of the channels 402 and is shown operating the mapper 412 and the correction decoder 414 without the hard selector 416. Also, the failed channel 404 is operating with part of the cross channel decoder 410.

The channels 402, the channel decoder 408, or at least a portion of the channel decoder 408 can be implemented with hardware circuitry, software, or a combination thereof in a number of ways. For example, the storage engine 115 can be implemented as a processor, an application specific integrated circuit (ASIC) an embedded processor, a microprocessor, a hardware control logic, a hardware finite state machine (FSM), a digital signal processor (DSP), or a combination thereof.

In the example shown in FIG. 4, the cross channel decoder 410 can utilize the information from the remaining channels 406 to help decode the failed channel 404. The cross channel decoder 410 can include an aggregator 422, a selector 424, a soft combiner 426, a scalar 428, or a combination thereof.

For this example, the aggregator 422 calculates a combination of the hard decisions 420. The aggregator 422 can generate an aggregated output 430 from the hard decisions 420 from each channel decoder 408 or more specifically the hard selector 416 from the remaining channels 406.

As a specific example, the embodiment shown in FIG. 4 is for an N+1 RAID whose parity is XOR of the data across the stripe of N channels 402 (or blocks). Since the XOR of two linear codewords 216 is also a valid codeword 216, if the N channels 402 are encoded with the same linear ECC code, then the parity channel 402 is also protected by the same ECC and can be decoded with the same ECC decoder separately. In this example, the aggregator 422 performs the XOR function and the aggregated output 430 is a XOR of the hard decisions 420 from the remaining channels 406.

As shown as an example in FIG. 4, if any of the channels 402 failed, the computing system 100 can issue a reread of all N+1 channels 402. If no channel input or decoding output data are stored in normal decoding processing, when a channel 402 has decoding failure, such as the failed channel 404, all the channels 402 including the failed channel 404 have to redo the NAND reading again. In this example, decoding failure refers to the ECC decoder, such as the correction decoder 414, detecting an error. In this example, the as the correction decoder 414 is shown as an LDPC decoder but is not limited to LDPC decoder.

FIG. 4 depicts an example for recovering one of the channels 402, depicted as the failed channel 404. The remaining channels 406 can perform the normal decoding procedures with the channel decoder 408. The channel decoder 408 can output the hard decisions 420 and can also output the soft information 218 (for example in terms of LLR magnitudes 415) if their channel 402 decoding failed. For all channels 402 that failed, the computing system 100 functions to recover those failed channels 404 with the remaining channels 406.

Returning to the description of the cross channel decoder 410, the selector 424 determines which of the magnitudes 415 to output as a selected magnitude 432 to the soft combiner 426. The selector 424 computes the selected magnitude 432 with the minimum value of the magnitudes 415 from the remaining channels 406 where the correction decoder 414 failed or detected an error. If all the N remaining channels 406 decoded successfully, simple RAID recovery scheme can take care of this case and the failed channel 404 and soft RAID is not required. However, if for any reason, soft RAID is used instead of RAID recovery, the min|LLR| shall be set to a pre-defined fixed value.

The soft combiner 426 calculates an extrinsic soft information 434. As an example, the calculation can be performed with the hard decisions 420 and the magnitudes 415. The soft combiner 426 can input the hard decision 420 from the aggregator 422, labeled as the aggregated output 430. The soft combiner 426 also receives the selected magnitude 432. After obtaining the sign 413 as the aggregated output 430 and the min|LLR| as the selected magnitude 432 from the remaining N channels 406 for each code bit, the aggregated output 430 and selected magnitude 432 are combined to generate an extrinsic soft information 434, such as an extrinsic LLR. The extrinsic soft information 434 can be output to the scalar 428.

A remaining decoder 429 can take the information from the remaining channels 406 to be used to help decode the failed channel 404. For example, the remaining decoder 429 can take the data 303 for each of the remaining channels 406 and get processed through their respective channel decoder 408. The output of the channel decoder 408 can be processed by the aggregator 422, the selector 424, the soft combiner 426, or a combination thereof to generate the extrinsic soft information 434. As a specific example, the remaining decoder 429 can represent a one dimensional LDPC-RAID.

The scalar 428 performs calculations to correct the failed channel 404 based on the information from the remaining channels 406. The failed channel 404 is also shown to include the mapper 412. The mapper 412 for the failed channel 404 can input the hard information 222 or the soft information 218 as the mapper for the remaining channels 406. The mapper 412 in the failed channel 404 can function similarly as described for the mapper 412 in the remaining channels 406. The mapper 412 for the failed channel 404 can output a soft metric 411 for the failed channel 404.

Returning to the scalar 428, the soft metric 411 for the failed channel 404 is combined with the extrinsic soft information 434 to output a scaled soft metric 436. The scaled soft metric 436 can also include attributes of a soft information 218.

For example, the scalar 428 can calculate the scaled soft metric 436 with a linear combination $LLR_{input} = \alpha LLR_{channel} + \beta LLR_{extrinsic}$, where $\alpha$ and $\beta$ are scaling factors depending on the configuration. The term $LLR_{input}$ in this equation represents the scaled soft metric 436. The term $LLR_{channel}$ in this equation represents the soft metric 411 for the failed channel 404. The term $LLR_{extrinsic}$ in this equation represents the extrinsic soft information 434.

The scaling factors $\alpha$ and $\beta$ can be determined in a number of ways. The scaling factors $\alpha$ and $\beta$ can be based on the specifics about the channels 402 or the sources of data for the channels 402. The scaling factors are based in physical characteristics of the channels being read. As an example, factors that can be used to determine the scaling factors include the type of ECC decoder is used, the channel condition, the amount or value of the soft information 218, and the mapper 412.

The cross channel decoder 410, or as a specific example the scalar 428, can output the scaled soft metric 436 to the correction decoder 414 for the failed channel 404. If the correction decoder 414 for the failed channel 404 does not detect an error, then the combined information from the cross channel decoder 410 and the remaining channels 406 successfully aided in correcting the error to a previously failed channel 404.

As an example, with proper scheduling and configuration, the mechanism described can be applied in such a way that all failed channels 404 perform soft RAID decoding simultaneously. Moreover, if the all the successfully decoded codewords 216 in a RAID stripe can be stored during soft RAID decoding, the soft RAID decoding can be performed for multiple iterations. In other words, if multiple channels 402 failed, if one iteration successfully corrects a failed channel 404, another iteration can be performed with the corrected failed channel 404 to correct other failed channels, such as the remaining channels 406 that failed or another failed channel (not shown). This process can continue until all the failed channels 404 have been corrected or until no additional failed channels 404 can be corrected.

As a further example, all the channels 402 with decoding failures can be decoded with information with the remaining channels 406 concurrently.

Figure 5:
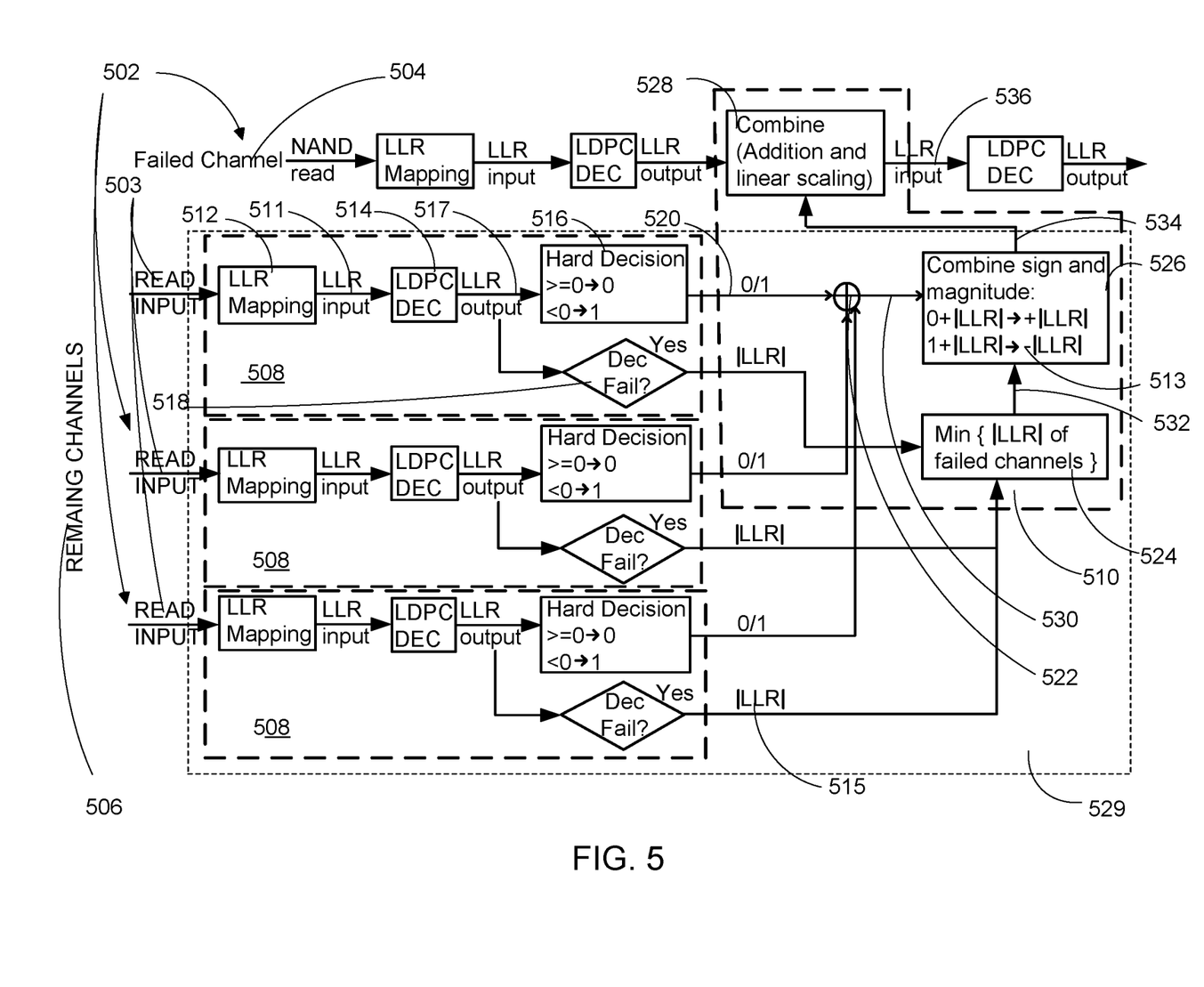
FIG. 5 is an example of a flow chart for a portion of the computing system for the data protection mechanism in a further embodiment.

Referring now to FIG. 5, therein is shown is an example of a flow chart for a portion of the computing system 100 of FIG. 1 for the data protection mechanism in a further embodiment. The description for the elements in FIG. 4 applies to the elements in FIG. 5 with the same element name with the element number starting in the 500s rather than 400s.

For example, FIG. 5 depicts an example with channels 502, a failed channel 504, and remaining channels 506. The description for these elements are same or similar to the descriptions for the channels 402 of FIG. 4, the failed channel 404 of FIG. 4, and the remaining channels 406 of FIG. 4, respectively. The difference between the failed channel 504 and the failed channel 404 will be noted later. The descriptions for the elements in FIG. 5 are not repeated for brevity.

Similar to FIG. 4, the remaining channels 506 can include a channel decoder 508. The channel decoder 508 from each of the remaining channels 506 output to a cross channel decoder 510. In this embodiment as an example, the channel decoder 508 can include a mapper 512, a correction decoder 514, a hard selector 516, or a combination thereof. The channel decoder 508 can also include a failure query 518.

The mapper 512 can calculate a soft metric 511 based on the hard information 222 of FIG. 2. The soft metric 511 can include a sign 513 and a magnitude 515 from the read data. The correction decoder 514 can output a decoded output 517. The decoded output 517 can include a sign 513 and a magnitude 515. The hard selector 516 calculates a b-tuple value as hard decisions 520 from the decoded output 517. The cross channel decoder 510 can include an aggregator 522, a selector 524, a soft combiner 526, a scalar 528, or a combination thereof.

In this example as an embodiment, the correction decoder 514 for the failed channel 504 that can store the decoded output 517, which is soft output, when decoding failed. In this way, if any of the channels 502 failed, there is no need to reread all N+1 channels 502 again. Also for this embodiment as an example, the scalar 528 is after and before the execution of the correction decoder 514 for the failed channel 504. In this example, the correction decoder 514 can be the same before or after the scalar 528. Also, the correction decoder 514 can provide different functions between before or after the scalar 528.

An extrinsic soft information 534 is computed in the same way as described in FIG. 4 for the extrinsic soft information 434 of FIG. 4, but instead of combining the extrinsic soft information 534 with the soft metric 511, the scalar 528 combines the extrinsic soft information 534 with the decoded output 517 from previous failed decoding of the correction decoder 514. A remaining decoder 529 can function as described in FIG. 4.

As similarly described earlier, this embodiment can perform iterative decoding and correction without the need for re-reading data 503. In other words, once the failed channel 504 has been corrected, then the once failed channel 504 can be used to correct another instance of the failed channel 504 or other remaining channels 506.

As a further example, all the channels 502 with decoding failures can be decoded with information with the remaining channels 506 concurrently.

Figure 6:
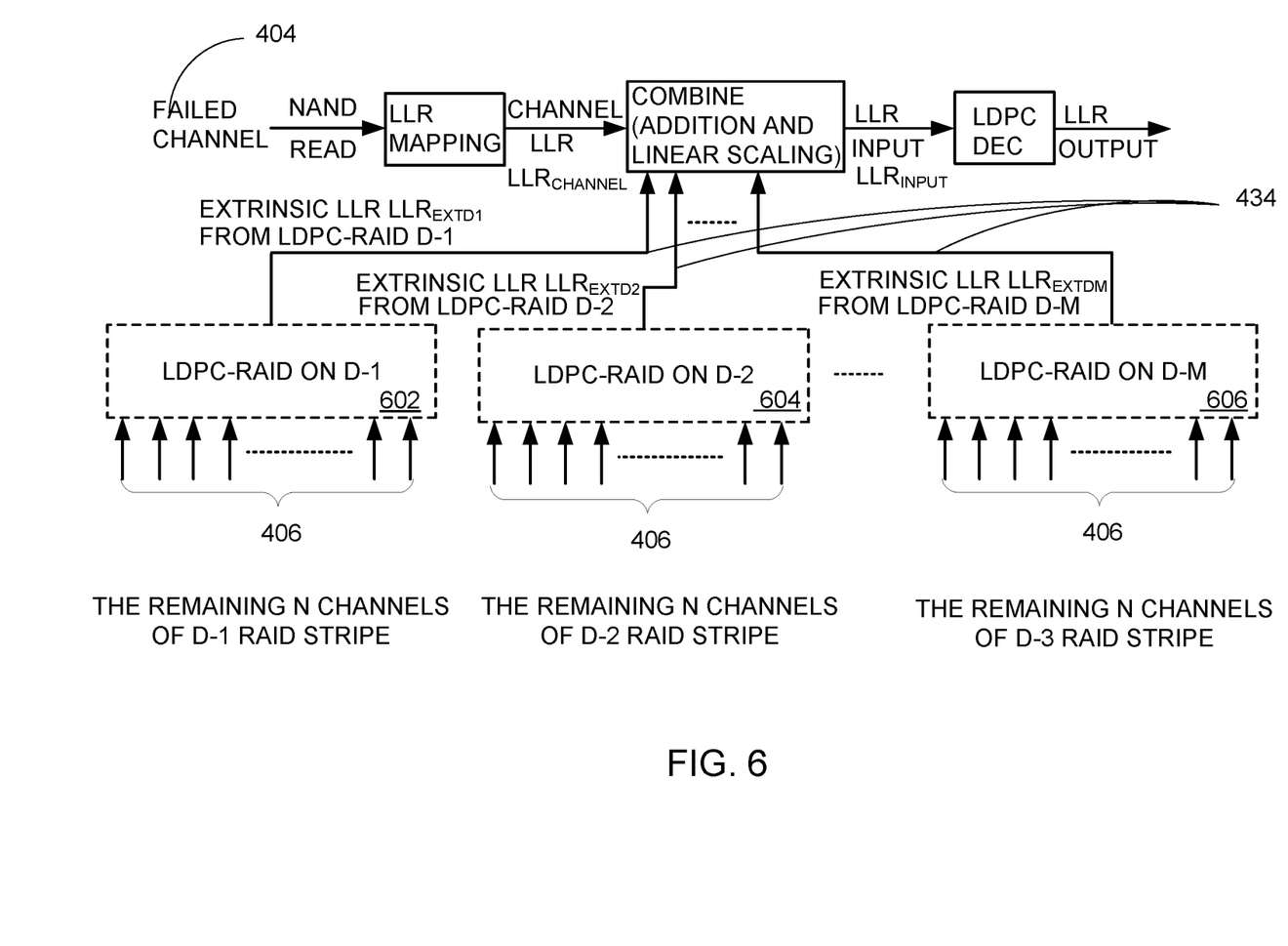
FIG. 6 is an example of a flow chart for a portion of the computing system with additional parallel processing in a yet further embodiment.

Referring now to FIG. 6, therein is shown an example of a flow chart for a portion of the computing system 100 with additional parallel processing in a yet further embodiment. FIG. 6 depicts an example where the failed channel 404 is decoded using information from different groups of the remaining channels 406. As a specific example, FIG. 6 can represent the multi-dimension M×(N+1) RAID scheme as discussed in FIG. 4 and using the architecture shown in FIG. 4 for the failed channel 404.

In this example, FIG. 6 depicts a first decoder 602, a second decoder 604, and an M decoder 606 and each is an example of the remaining decoder 429 of FIG. 4. Continuing with this example, the first decoder 602 can operate on dimension one or the first dimension denoted as "D−1". The second decoder 604 can operate on dimension two or the second dimension denoted as "D−2". The M decoder 606 can operate on dimension M or the Mth dimension denoted as "D−M".

Continuing with this example, the failed channel 404 can operate similarly as described as FIG. 4 but a scalar 628 differs from the scalar 428 of FIG. 4 so the scalar 628 can process the extrinsic soft information 434 from the first decoder 602, the second decoder 604, through the M decoder 606. The scalar 628 performs the operation based on $$LLR_{input} = \alpha LLR_{channel} + \Sigma_{i=1}^{M} \beta_i LLR_{extDi}$$

where $\alpha$ and $\beta_i$ are scaling factors of channel input LLR and D−i RAID stripe extrinsic LLR, respectively.

The first decoder 602 through the M decoder 606 can be performed in parallel.

Figure 7:
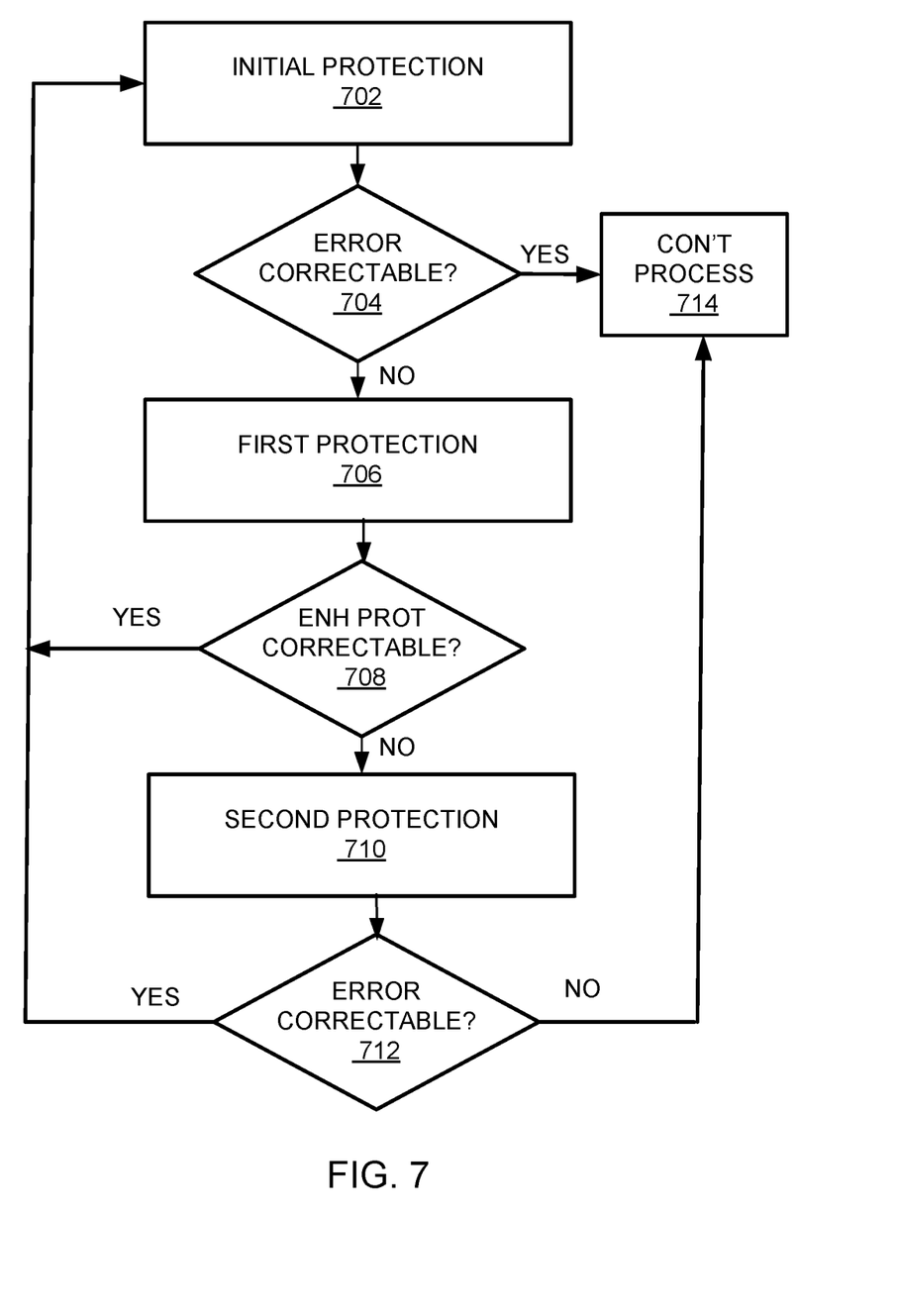
FIG. 7 is a flow chart of the computing system in an embodiment.

Referring now to FIG. 7, therein is shown a flow chart of the computing system 100 in an embodiment. In this embodiment, the computing system 100 can decode the entire data block 202 of FIG. 2 as a RAID block. In an initial protection block 702, the computing system 100 can first attempt to correct each of the data sectors 210 of FIG. 2 using the sector redundancy 214 of FIG. 2 as the sector ECC.

Further the sector redundancy 214 can utilize soft information 218 of FIG. 2 associated with the data page 208 of FIG. 2. The soft information 218 can provide some measure of reliability of a channel. Examples of the soft information 218 can include Flash Log-Likelihood-Ratio (LLR) and can be utilized by the first protection 204. Similarly, as noted earlier, the first protection 204, the second protection 206 of FIG. 2, or a combination thereof can also utilize soft information 218 associated with the data page 208 of FIG. 2.

Returning to the description of the flow chart, if the initial protection block 702 is successful as determined by an error correctable block 704, then the process can continue to process the data sector 210 in a continue processing block 714, which can continue verifying the data block 202. If it is uncorrectable as determined in the error correctable block 704, the computing system 100 can apply RAID assisted decoding. As a more specific example, the codeword 216 of FIG. 2 can be a Bose, Chaudhuri, and Hocquenghem (BCH) codeword and the data protection mechanism as a RAID parity as noted above.

For illustrative purposes, the codeword 216 is described as a BCH codeword, although it is understood the codeword 216 can be other types using different error detection and correction codes. For example, other block codes can be utilized to form the codeword 216. As more specific examples, the codeword 216 can be formed with Reed-Solomon code or Low Density Parity Check (LDPC) code or other error detection or error correction code that can input or output hard information 222, soft information 218, or a combination thereof.

Where the computing system 100 flip the symbols 220 in the uncorrectable sector, as determined by an enhanced correctable block 708, corresponding to the nonzero symbols 220 in where Q and R are the page and RAID parities and attempt correction again, iterating back to the initial protection block 702, with the sector redundancy 214 in a second protection block 710. If the one of the data sectors 210 being decoded is still uncorrectable as determined in an enhanced corrected block 712, then an embodiment can continue to decoding to the other data page 208 in the data block 202 by iterating back to the initial protection block 702.

As an example, the decoding flow chart as described in FIG. 4, FIG. 5, or a combination thereof can also be applied when decoding the first protection 204, the second protection 206, or a combination thereof. The first protection block 706, the second protection block 710, or a combination thereof can process the flow chart in the examples shown in FIG. 4 or FIG. 5.

As a more specific example, the computing system 100 can choose the first sector from the data sectors 210 of FIG. 2 on the first page from the data page 208 as the "target" sector, which can be used to measure performance. The computing system 100 can generate all the data pages 208 in the data block 202. In the initial protection block 702, the computing system 100 then attempt to decode every one of the data sectors 210 in the target instance of the data page 208 using the sector redundancy 214 of FIG. 2, such as the sector ECC, BCH, RS, LDPC, or any other error correction schemes, for each of the data sectors 210. If the target sector is correctable, as determined in the error correctable block 704, then an embodiment can be done or continue to process the data sector in the continue processing block 714, otherwise an embodiment can apply RAID assist for the target sector in the first protection block 706. If this fails as determined in the enhanced corrected block 712, the computing system 100 continues to apply RAID assist to each uncorrectable instance of the data sectors 210 in the target instance of the data page 208 and iterated to verify the data block 202.

Whenever RAID assist is successful on a previously uncorrectable instance of the data sectors 210, the computing system 100 can reapply RAID assist for the target sector. This is repeated until the computing system 100 is able to correct the target sector or the computing system 100 has applied RAID assist to every uncorrectable instance of the data sectors 210 in the target sector. If the computing system 100 has attempted correction on every uncorrectable instance of the data sectors 210 on the target page, the computing system 100 repeat the correction process with the next instance of the data page 208. This continues, until the computing system 100 has processed all the data pages 208 or the computing system 100 is able to correctly decode the target sector.

It has been discovered that embodiments provide error detection, error correction, or a combination thereof using hard information, soft information, or a combination thereof. Various embodiments can also recovery data as hard information using soft information generated by the channel decoder and the cross channel decoder.

It has been discovered that embodiments provide improved tolerance raw bit error rate (RBER) for a given sector failure rate (SFR) with a mechanism allowing information from one channel to be used to correct errors in another channel. For example, when one of the channels fails, information from the remaining channels can be used to help decode the failed channel. Once the failed channel has been corrected, the mechanism can be iterated to allow information from the corrected failed channel to correct other channels.

It has been further discovered that embodiments provide improved tolerance raw bit error rate for a given sector failure rate by utilizing both hard information and soft information to decode the channels. The embodiments can combine channels that did not detect errors with channels that detect errors to correct error in a failed channel.

It has been discovered that embodiments provide improved tolerance raw bit error rate for a given sector failure rate with a cross channel decoder allowing the failed channel to use information from the remaining channels, whether or not the remaining channels also failed decoding or successfully decoded.

It has been discovered that embodiments provide improved RBER for a given SFR. Embodiments provide soft decoding allowing about 70% more tolerance of RBER for a given sector failure rate compared to normal BCH decoding, about 2× more tolerance in RBER for a given SFR for hard reads, about 4× more tolerance in RBER for a given SFR for 2 soft reads, about 5× more tolerance in RBER for a given SFR for one iteration for 2 soft reads, and about 7× more tolerance in RBER for a given SFR for four iteration for 2 soft reads.

The software described in this application can be implemented as instructions stored on a non-transitory computer readable medium to be executed by the computing system 100. The non-transitory computer medium can include memory internal to or external to the computing system 100. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 8:
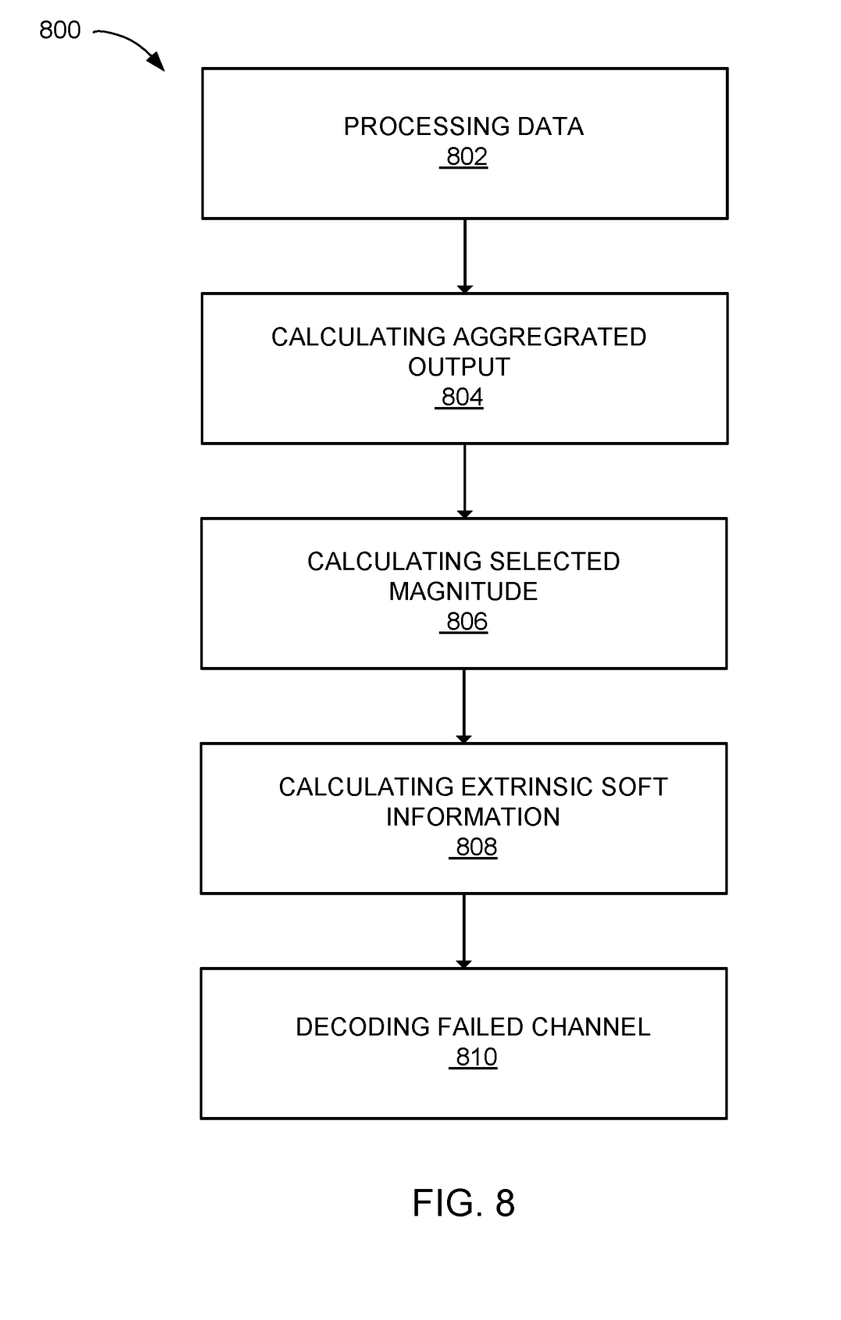
FIG. 8 is a flow chart of a method of operation of a computing system in an embodiment.

Referring now to FIG. 8, therein is shown a flow chart of a method 800 of operation of a computing system 100 in an embodiment of the present invention. The method 800 includes: processing data, as hard information or soft information, through channels including a failed channel and a remaining channel in a block 802; calculating an aggregated output from a hard decision from the remaining channel in a block 804; calculating a selected magnitude from a magnitude from the remaining channel with an error detected in a block 806; calculating an extrinsic soft information based on the aggregated output and the selected magnitude in a block 808; and decoding the failed channel with a scaled soft metric based on the extrinsic soft information in a block 810.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    a data block including a data;
    a storage engine, coupled to the data block, configured to:
        process the data, as hard information or soft information, through channels including a failed channel and remaining channels each including a different redundant array of independent disks (RAID) stripe of the data,
        calculate an aggregated output from a hard decision from the remaining channels,
        calculate a selected magnitude from a magnitude from the remaining channels with an error detected by determining a minimum log likelihood ratio (LLR) of the remaining channels as the magnitude,
        calculate an extrinsic soft information based on the aggregated output and the selected magnitude, and
        decode the failed channel with a scaled soft metric based on the extrinsic soft information; and
    a host interface bus, coupled to the storage engine, configured to transfer the data including transferring the data corrected from the failed channel and the data from the remaining channels.

2. The system as claimed in claim 1 wherein the storage engine is further configured to calculate the scaled soft metric with a soft metric, based on the hard information or the soft information, of the failed channel.

3. The system as claimed in claim 1 wherein the storage engine is further configured to calculate the scaled soft metric with a decoded output of the failed channel.

4. The system as claimed in claim 1 wherein the storage engine is further configured to calculate a decoded output of the failed channel based on the scaled soft metric.

5. The system as claimed in claim 1 wherein the storage engine is further configured to decoding a further channel with information from the failed channel successfully decoded.

6. The system as claimed in claim 1 wherein the storage engine is further configured to calculate the extrinsic soft information based on combining the aggregated output as a sign and the selected magnitude.

7. The system as claimed in claim 1 wherein the storage engine is further configured to calculate the scaled soft metric based on the extrinsic soft information and a soft metric of the failed channel.

8. The system as claimed in claim 1 wherein the storage engine is further configured to calculate the selected magnitude based on selecting a minimum from the magnitude from the remaining channel with the error detected.

9. The system as claimed in claim 1 wherein the storage engine is further configured to decode the failed channel with a sector redundancy.

10. The system as claimed in claim 1 wherein the storage engine is further configured to decode the failed channel with a first protection.

11. A method of operation of a computing system comprising:
processing data, as hard information or soft information, through channels including a failed channel and remaining channels each including a different redundant array of independent disks (RAID) stripe of the data;
calculating an aggregated output from a hard decision from the remaining channels;
calculating a selected magnitude from a magnitude from the remaining channels with an error detected by determining a minimum log likelihood ratio (LLR) of the remaining channels as the magnitude;
calculating an extrinsic soft information based on the aggregated output and the selected magnitude;
decoding the failed channel with a scaled soft metric based on the extrinsic soft information; and
transferring the data corrected from the failed channel and the data from the remaining channels through a host interface bus.

12. The method as claimed in claim 11 wherein decoding the failed channel includes calculating the scaled soft metric with a soft metric, based on the hard information or the soft information, of the failed channel.

13. The method as claimed in claim 11 wherein decoding the failed channel includes calculating the scaled soft metric with a decoded output of the failed channel.

14. The method as claimed in claim 11 wherein decoding the failed channel includes calculating a decoded output based on the scaled soft metric.

15. The method as claimed in claim 11 further comprising decoding a further channel with information from the failed channel successfully decoded.

16. The method as claimed in claim 11 wherein calculating the extrinsic soft information includes combining the aggregated output as a sign and the selected magnitude.

17. The method as claimed in claim 11 further comprising calculating the scaled soft metric based on the extrinsic soft information and a soft metric of the failed channel.

18. The method as claimed in claim 11 wherein calculating the selected magnitude includes selecting a minimum from the magnitude from the remaining channel with the error detected.

19. The method as claimed in claim 11 wherein decoding the failed channel includes decoding with a sector redundancy.

20. The method as claimed in claim 11 wherein decoding the failed channel includes decoding with a first protection.

21. A non-transitory computer readable medium including instructions for execution, the medium comprising:
processing data, as hard information or soft information, through channels including a failed channel and remaining channels each including a different redundant array of independent disks (RAID) stripe of the data;
calculating an aggregated output from a hard decision from the remaining channels;
calculating a selected magnitude from a magnitude from the remaining channels with an error detected by determining a minimum log likelihood ratio (LLR) of the remaining channels as the magnitude;
calculating an extrinsic soft information based on the aggregated output and the selected magnitude;
decoding the failed channel with a scaled soft metric based on the extrinsic soft information; and
transferring the data corrected from the failed channel and the data from the remaining channels through a host interface bus.

22. The medium as claimed in claim 21 wherein decoding the failed channel includes calculating the scaled soft metric with a soft metric, based on the hard information or the soft information, of the failed channel.

23. The medium as claimed in claim 21 wherein decoding the failed channel includes calculating the scaled soft metric with a decoded output of the failed channel.

24. The medium as claimed in claim 21 wherein decoding the failed channel includes calculating a decoded output based on the scaled soft metric.

25. The medium as claimed in claim 21 further comprising decoding a further channel with information from the failed channel successfully decoded.

26. The medium as claimed in claim 21 wherein calculating the extrinsic soft information includes combining the aggregated output as a sign and the selected magnitude.

27. The medium as claimed in claim 21 further comprising calculating the scaled soft metric based on the extrinsic soft information and a soft metric of the failed channel.

28. The medium as claimed in claim 21 wherein calculating the selected magnitude includes selecting a minimum from the magnitude from the remaining channel with the error detected.

29. The medium as claimed in claim 21 wherein decoding the failed channel includes decoding with a sector redundancy.

30. The medium as claimed in claim 21 wherein decoding the failed channel includes decoding with a first protection.

* * * * *